June 6, 1961

R. S. NEVILLE ET AL 2,986,820

TECHNIQUE AND MEANS FOR RENDERING CERTAIN MATERIAL INVISIBLE

Filed Feb. 26, 1958

Inventors
RICHARD S. NEVILLE
ARTHUR M. MALIAN

By Kane, Dalsimer & Kane
Attorneys

June 6, 1961  R. S. NEVILLE ET AL  2,986,820
TECHNIQUE AND MEANS FOR RENDERING CERTAIN
MATERIAL INVISIBLE Filed Feb. 26, 1958  9 Sheets-Sheet 2

Inventors
RICHARD S. NEVILLE
ARTHUR M. MALIAN

By Kane, Dalsimer & Kane
Attorneys

Trouble

21

The push-pull amplifier does not operate at all. Absolutely no sound comes from the loudspeaker. Inspection reveals that all the tubes are warm, and there is no obvious physical damage. Locate and replace the part causing the trouble.

Remedy

RESULT OF PART REPLACEMENT

SR = Symptoms Remain

TC = Trouble Corrected

22

| Part | Result |
|------|--------|
| 1 | |
| 2 | |
| 3 | |
| 4 | |
| 5 | |
| 6 | |
| 7 | |
| 8 | |
| 9 | |
| 10 | |
| 11 | |
| 12 | |
| 13 | |
| 14 | |
| 15 | |
| 16 | |

23

| Part | Result |
|------|--------|
| 17 | |
| 18 | |
| 19 | |
| 20 | TC 15 |
| 21 | |
| 22 | |
| 23 | |
| 24 | |
| 25 | |
| 26 | |
| 27 | |
| 28 | |
| 29 | |
| 30 | |
| 31 | |
| 32 | |

Fig. 9.

Inventors
RICHARD S. NEVILLE
ARTHUR M. MALIAN

By Kane, Dalsimer & Kane
Attorneys

Symptoms

TEST POINT DATA

| Test Point | Resistance 24 | Voltage 25 | Signal 26 | | |
|---|---|---|---|---|---|
| V-1 1. | | | | | 1 |
| 2. | | | | | 2 |
| 3. | | | normal | 3 | 3 |
| 4. | | | | | 4 |
| 5. | | | normal | 2 | 5 |
| 6. | | | | | 6 |
| 7. | | | | | 7 |
| 8. | | | | | 8 |
| V-2 1. | | | | | 1 |
| 2. | | | | | 2 |
| 3. | | | normal | 5 | 3 |
| 30 4. | Inf | | | | 4 |
| 5. | 1meg | | normal | 4 | 5 |
| 6. | Inf | | | | 6 |
| 7. | | | | | 7 |
| 8. | | | | | 8 |
| V-3 1. | | | | | 1 |
| 2. | | | | | 2 |
| 3. | | | high | 11 | 3 |
| 4. | | | | | 4 |
| 5. | | | normal | 7 | 5 |
| 6. | | | | | 6 |
| 7. | | | | | 7 |
| 8. | | | normal | 9 | 8 |
| V-4 1. | | | | | 1 |
| 2. | | | | | 2 |
| 3. | | | high | 12 | 3 |
| 4. | | | | | 4 |
| 5. | | | normal | 8 | |
| 6. | | | | | |
| 7. | | | | | 7 |
| 8. | | | normal | 10 | 8 |
| V-5 1. | | | | | 1 |
| 2. | | | | | 2 |
| 3. | | | | | 3 |
| 4. | | | | | 4 |
| T-1 1 to 2 | | | no sig | 13 | T-1 |
| A. | | | | | A |
| B. | | | normal | 6 | B |
| C. | | | | | C |
| D. | | +285 | | 1 | D |

Fig. 9A.

Inventors
RICHARD S. NEVILLE
ARTHUR M. MALIAN
By Kane, Dalsimer & Kane
Attorneys

Symptoms

RESISTANCE ACROSS INDIVIDUAL PARTS

| Part | 27 Resistance | 20 |
|---|---|---|
| C-1 | | |
| C-2 | | |
| C-3 | | |
| C-4 | | |
| C-5 | | |
| C-6 | | |
| C-7 | | |
| C-8 | | |
| C-9 | | |
| R-2 | | |
| R-3 | | |
| R-5 | | |
| R-6 | | |
| R-7 | | |
| T-1 (BL to R) | | |
| T-1 (R to Y) | | |
| T-1 (BL to gnd) | | |
| T-1 (1 to 2) | Inf | .14 |
| T-1 (1 to gnd) | | |
| S-1 (ON) | | |
| S-1 (OFF) | | |
| F-1 | | |
| Speaker Coil | | |

POWER TRANSFORMER CHECKS

| Test Point | 28 AC Voltage | 29 Resistance |
|---|---|---|
| T-2 1 to 3 | | |
| 5 to 7 | | |
| 7 to 9 | | |
| 6 to 8 | | |
| 8 to 10 | | |
| 6 to 10 | | |
| 2 to 4 | | |
| 1 to gnd (with 1 and 3 disconnected from circuit) | | |
| 5 to gnd (with 5, 7, 9 disconnected from circuit) | | |
| 6 to gnd (with 6, 8, 10 disconnected from circuit) | | |
| 2 to gnd (with 2 and 4 disconnected from circuit) | | |
| 2 to gnd (with 2 and 4 connected to circuit) | | |

Fig. 9B.

Inventors
RICHARD S. NEVILLE
ARTHUR M. MALIAN

By Kane, Dalsimer & Kane
Attorneys

June 6, 1961         R. S. NEVILLE ET AL         2,986,820
        TECHNIQUE AND MEANS FOR RENDERING CERTAIN
                    MATERIAL INVISIBLE
Filed Feb. 26, 1958                           9 Sheets-Sheet 9

*Fig. 10A.*

*Your Score*

*step 3...*

*step 4...*

*step 7...*

*steps 8-9-10...*

TABLE 1A CORRECTOIN
| 1st Shot | 2nd Shot | 3rd Shot |
|---|---|---|
| -35 | -4 | 0 |
| -36 | -4 | -2 |
| -36 | -4 | 0 |
| -35 | -1 | -5 |

*step 11...*

MOTION OF BODY
| 1st Shot | 2nd Shot | 3rd Shot |
|---|---|---|
| 0 | +15 | +15 |
| +15 | +30 | +30 |
| 0 | -15 | -15 |
| -15 | -30 | -30 |

*step 14...*

1....
2....
3....
4....
5....
6....
7....
8....
9....
10....
11....
12....
13....
14....
15....
16....
17....
18....  (75%)
19....
20....
21....
22....
23....
24....
25....
26....
27....
28....
29....

†a... Wrong; refer to Text, page 6
†b... Wrong; refer to Text, page 8
†c... Scheduled time of observation;
     1516, 1520 & 1524, DR for 1520
†d... 1st. shot, Deneb
      2nd. shot, Nunki
      3rd. shot, Arcturus
†e... Actual time of observation;
      1516, 1521 & 1525
†f... Fix time; 1525

†g... Hs Deneb; 60-10
†h... Hs Nunki; 23-01
†i... Hs Arcturus; 35-01
†j... Hs Deneb; 58-18
†k... Hs Nunki; 24-05
†l... Hs Arcturus; 30-27
†m.. After adjusting plotting longitude,
     show your fix position.
†n... Correct heading and winds
†o... Correct ETA and Heading

*footnotes*

Inventors
RICHARD S. NEVILLE
ARTHUR M. MILIAN
By Kane, Dalsimer & Kane
     Attorneys

United States Patent Office 2,986,820
Patented June 6, 1961

2,986,820
TECHNIQUE AND MEANS FOR RENDERING CERTAIN MATERIAL INVISIBLE
Richard S. Neville, Staten Island, N.Y., and Arthur M. Malian, Montclair, N.J., assignors to Van Valkenburgh, Nooger & Neville, Inc., New York, N.Y., a corporation of New York
Filed Feb. 26, 1958, Ser. No. 717,663
2 Claims. (Cl. 35—9)

The present invention is concerned with the concealment of structures, and more particularly, with the concealment of structures which lie in substantially a single plane by the techniques of optical confusion.

It is well known that if a structure is to be concealed from visual observation, one of the most effective methods of doing so is to cover completely the structure with an opaque shield. This method of concealment, however, has several disadvantages which are not altogether apparent on first glance. In regard to large area structures, the most important disadvantage is the fact that any shield must be as massive or large in area as the structure to be hidden. When small structures, for example, printed matter on a sheet material such as paper, are to be concealed by an opaque shield, which opaque shield may be applied by conventional graphic arts methods, difficulties are encountered. These difficulties arise through the fact that thin films or multi-layers thereof containing so-called "opaque" pigments are rarely truly opaque to both reflected and transmitted light. These thin films are ordinarily between about 4 and about 75 microns in thickness. The concealed printed matter may be revealed by reflected light or what is hereinafter referred to as "show through" or the printed matter may be revealed by transmitted light which is hereinafter referred to as "see through." While "see through" and "show through" may be minimized by the application of a plurality of layers of concealing media or a single layer of sufficient thickness, such methods of application of such media contribute to the cost and complexity of manufacturing concealed units. In addition, it has been the prior art practice to resort also to additional shielding media on the back side of the printed sheet to minimize "see through" observation.

It is the principal object of the present invention to provide a method and means for temporarily concealing both small and large structures by optical confusion, without resorting primarily to the use of substantially completely opaque shields, and in particular, it is the object of this invention to provide means for temporarily concealing structures or printed information which invention represents an improvement over the subject matter disclosed in co-pending application Serial No. 662,182 filed May 28, 1957 for Technique and Means for Rendering Certain Material Invisible by I. M. Bernstein et al., which is assigned to the assignee of the instant application.

It is a further object of the present invention to dispose a confusing shield adjacent to the matter to be hidden, whether it be a structure or printed information, and between such hidden matter and the point of observation, wherein the matter to be hidden is composed of an intersticed or screened pattern, which pattern cooperates with the confusing shield and thus contributes to and enhances optical confusion so as to improve concealment of the hidden matter. On the other hand, the intersticed or screened patter constituting the hidden matter is of such nature to permit its observation upon removal of the interposed confusing shield.

It is a further object of the instant invention to provide apparatus and a method for temporarily securing separate items of printed information against view and for selectively exposing individual items of such information to view wherein the matter to be hidden is composed of printed information in which the letters or symbols thereof are made up of screened patterns, irregular or otherwise, of suitable colors; the hiding of such printed information is effected by printing or otherwise superimposing a shield thereover either of substantially solid and opaque material or preferably of a confusing pattern in the manner described and claimed in the foregoing co-pending application; advantageously the shield is characterized such that it is sectionally removable so that individual items of printed information hidden thereby may be exposed to view by removal of that portion of the shield overlying the particular item of information desired to be seen.

It is a further object of the present invention to provide economical and effective means for concealing printed matter from being revealed by means of reflected light and/or transmitted light through the application of printing ink applied by printing methods.

Other objects and advantages of the present invention will be apparent from the following description taken in conjunction with the drawings, in which:

FIGS. 7, 8 and 9 are to be considered together and illustrate the application of the invention to synthetic simulator apparatus wherein

Broadly stated, the present invention contemplates a process and apparatus for concealing a structure from visual observation by means of optical confusion. One method involves disposing an optical confusion shield adjacent to a non-unitary structure to be concealed, and between the structure to be concealed and the point of observation. The confusing shield may comprise a plurality of light absorbing or light transmitting areas, such as, lines, forms or spots separated from one another by physical or optical interstices, or light reflecting patterns or light scattering or diffracting patterns. For any given structure the confusing shield may advantageously combine any one or more elements of color, form, size, orientation and contrast which will best conceal the structure by optical confusion as to the interpretation of the image obtained on the human retinal screen.

In carrying the invention into practice, particularly with respect to concealment of printed information on sheet-like means or material such as paper, a confusing shield as contemplated in the co-pending application is preferably positioned upon or applied directly to the printed information to be hidden, or if the shield is to be separated from the information to be hidden thereby, such separation is substantially no greater than the thickness of an ordinary ink film. The confusing shield may take the form of a regular geometric pattern of light-absorbing figures interspersed with unprinted dots or spaces. It will be understood that the pattern for the shield may also be irregular and of diverse areas and shapes and of suitable colors. In selecting the pattern to be used one should, for optimum results, take into account the size, shape, color or pattern of the subject matter to be hidden thereby. If the means or sheet-like material supporting the printed information is of transparent material, such as a thick plastic film, an additional confusing shield may be applied on the back surface of the transparent material opposite the printed information to be concealed.

Normally, the matter to be hidden will be composed of separate items of printed information and, thus, it will be usually desirable to expose certain of such items of information to view while the other items remain hidden. This characteristic is particularly desirable when the invention is used to compose response apparatus as shown in Patent No. 2,764,821 issued October 2, 1956; note in particular the response charts shown in FIG. 5A of said patent. To achieve this result the confusing shield may be made of a suitable ink which allows printing of same over the information to be hidden and which may be removed segment-wise when desired. To effect economy and practicability, the selected ink may be of a type that can be applied to the chart-like means on which the information to be hidden is printed by ordinary discontinuous printing processes. Consequently the invention as illustrated herein contemplates an ink shield characterized by being removable segment-wise by a mild abrasive means such as a pencil eraser, which does not substantially affect the underlying printed information whether the latter be a letter, number, symbol, illustration or other printed form. In this manner, only the item desired to be seen will be exposed to view by removal of the portion of the shield overlying same.

Figure 1:
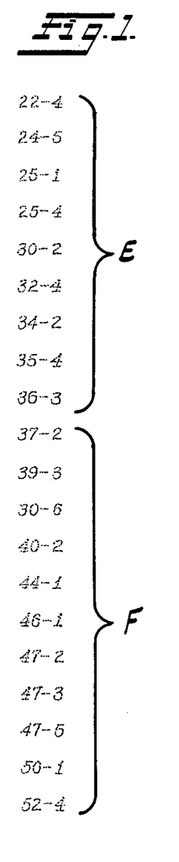
FIG. 1 shows a column of printed information wherein the lettered numbers are screened in accordance with the instant invention and which numbers are to be temporarily hidden from view.
Figure 3:
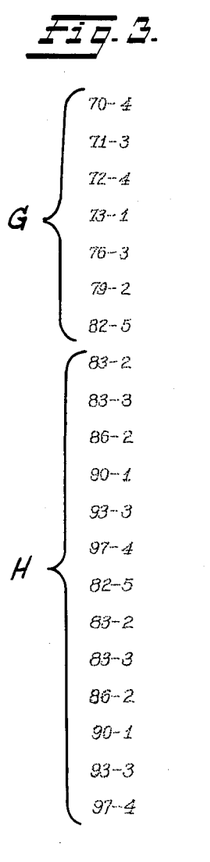
FIG. 3 shows another column of information printed in accordance with the instant invention.

Referring now to FIGS. 1 and 3, it will be understood that to practice the instant invention it has been found advantageous to print the matter to be concealed in a discontinuous form, that is to say, each of the items of printed information to be hidden temporarily from view itself will be made of a confusion pattern. As a result, the printed information itself contributes to the hiding qualities effected by the entire structure by means of co-operating with its overlying shield. It will be understood that the printed information to be hidden may be colored, contoured, oriented, scored or otherwise contrasted with its shielding layer so as to present the maximum confusion pattern to effect the best hiding qualities and, therefore, achieve the object of concealing printed information. Thus, it is within the contemplation of the present invention to conceal printed structures such as separate items of printed information by composing same as of a plurality of dots, bars, squares or other patterns, regular or irregular in shape, and separated by interstices upon which a suitable confusion shield is superimposed intermediate the observer and the information concealed thereby, which shield takes on the form as outlined in the co-pending application. The type of overlying confusion shield to be used and the area and shape of the item of printed information to be hidden thereby should be taken into consideration in the selection of the color, form, size and shape of the printed pattern composing the information to be concealed so as to effect optimum concealment. In other words, the selection of the shield and the selection of the individual symbols composing the printed matter should be regulated by the fact that each should complement the other to effect optimum concealment.

A particular advantage of the embodiment of the instant invention is that it permits the use of a screened printed pattern which can be most advantageously applied by photo-engraving or lithographic techniques in combination with letter-press printing methods of photo-lithographic methods. In the illustrated embodiment, the information to be hidden is composed of a system of dotted or checkered printed spots. It is possible to vary the tone of the printed pattern by printing same through various gradations so that the separate items of printed information are usually nearly visible to the naked eye when uncovered, but by suitably selecting a tone, the printed information, for example a letter, word, ideograph or symbol may be more effectively concealed from view against reflected and transmitted light when covered by the overlying and shielding confusion pattern.

Figure 2:
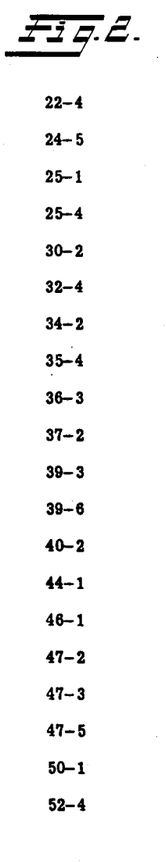
FIG. 2 shows a column of printed information according to the prior art.

FIG. 1 shows a column of information, in this instance lettered numbers, provided in accordance with the instant invention, and which numbers are to be subsequently hidden from view. The numbers in the upper portion of FIG. 1, indicated by reference E, are composed of letters made up of separate, distinct dots identified in the trade as screen No. 85, 70% density. In the printing trade, the screen number depicts the size of the printed area, such as the dots, whereas the percentage determines the density of dots in a given area. The lower half of the column, depicted by reference F, is made up of letters composed of 85 screen but 40% density and thus is not easily seen as the numbers depicted by E. The second column, FIG. 2, sets forth printed numbers in accordance with co-pending application, which numbers are composed of continuous, block or solid letters to be hidden by a confusion pattern. The third column, FIG. 3, at the upper portion and depicted by G shows letters to be hidden from view and printed in accordance with the instant invention, wherein the letters are composed of printing of 100 screen and 40% density whereas H depicts letters of 100 screen and 60% density. It is thus seen as the density increases, visibility of the letter to the naked eye increases likewise.

Figure 4:
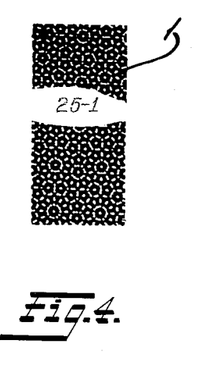
FIG. 4 shows the practice of the invention wherein the hidden information, screened numbers, is obscured from view by a confusing shield and wherein a section of the shield is removed so as to expose to view a selected number.

FIG. 4 illustrates a column of screen printed information hidden by a confusing shield 1. A section of the shield is removed so as to expose to view a selected answer, "25–1." It will be understood that the answer is printed on a suitable medium whereas shield 1 is an overlayer of ink printed directly upon the answers.

Figure 5:
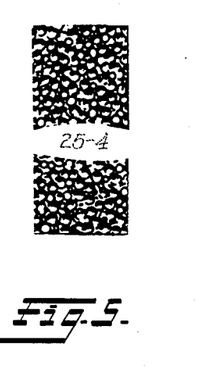
FIG. 5 is similar to FIG. 4 except that it employs a confusing shield of different design.
Figure 6:
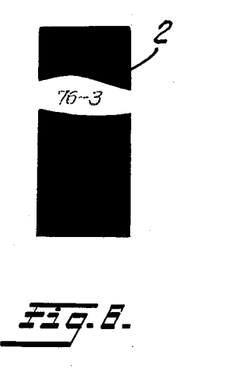
FIG. 6 is similar to the preceding two figures except that it employs a relatively solid opaque shield.

FIG. 5 illustrates the invention wherein the confusing shield is of different design. In FIG. 6, the overlayer of ink is an opaque shield 2 used in place of the confusing shields of the preceding figures.

Figure 7:
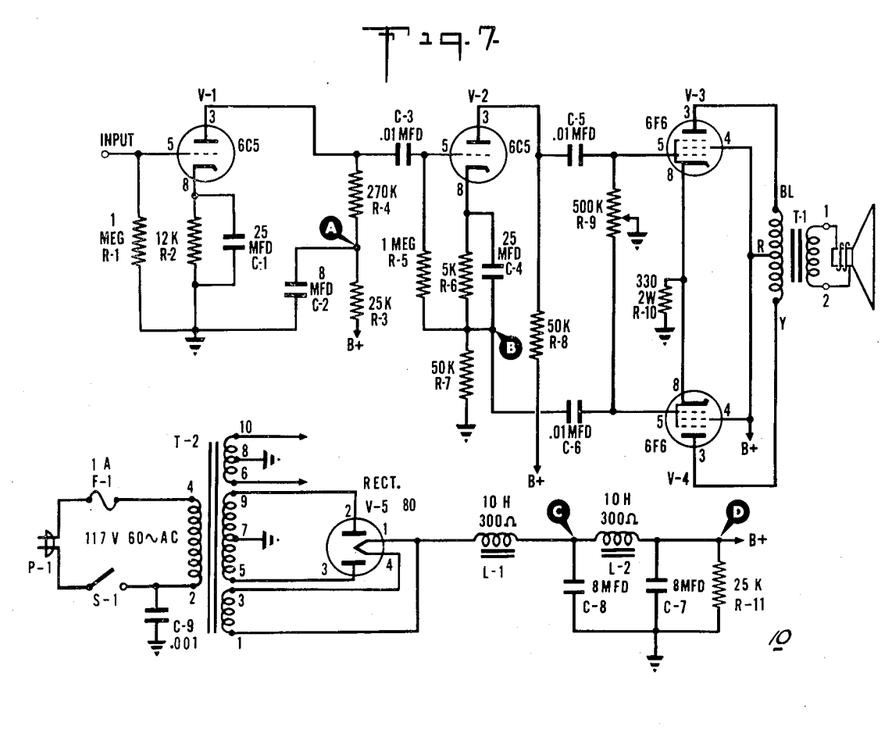
FIG. 7 is a reproduction of a chart showing a schematic diagram of electronic apparatus.
Figure 8:
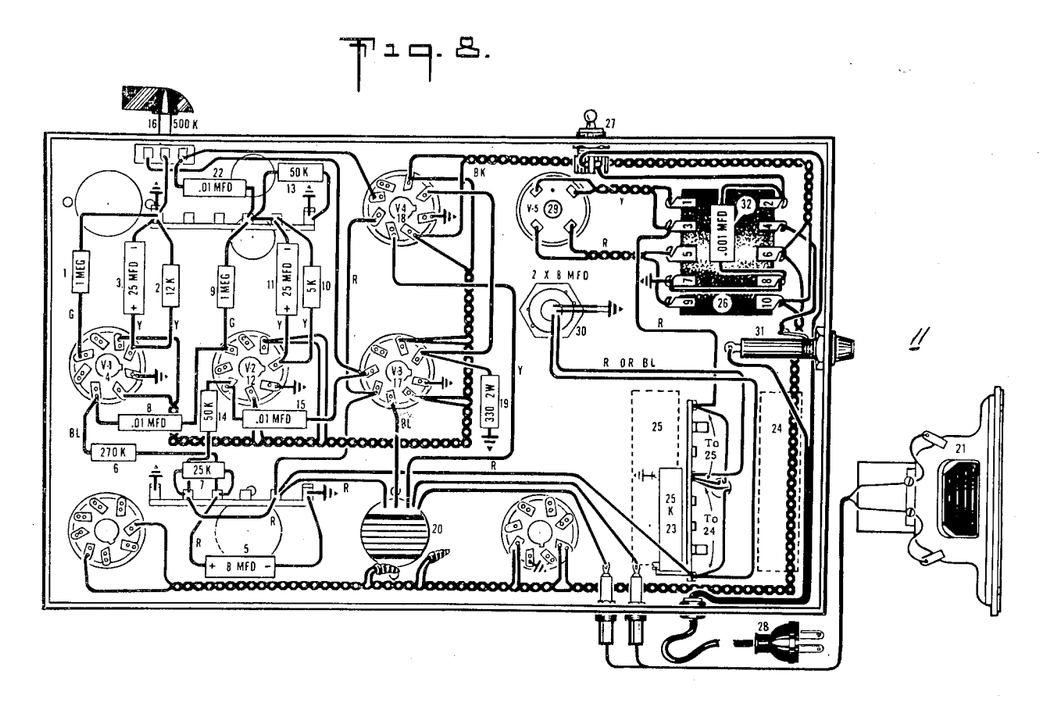
FIG. 8 is a reproduction of a chart showing a wiring diagram of the electronic apparatus.
Figure 9:
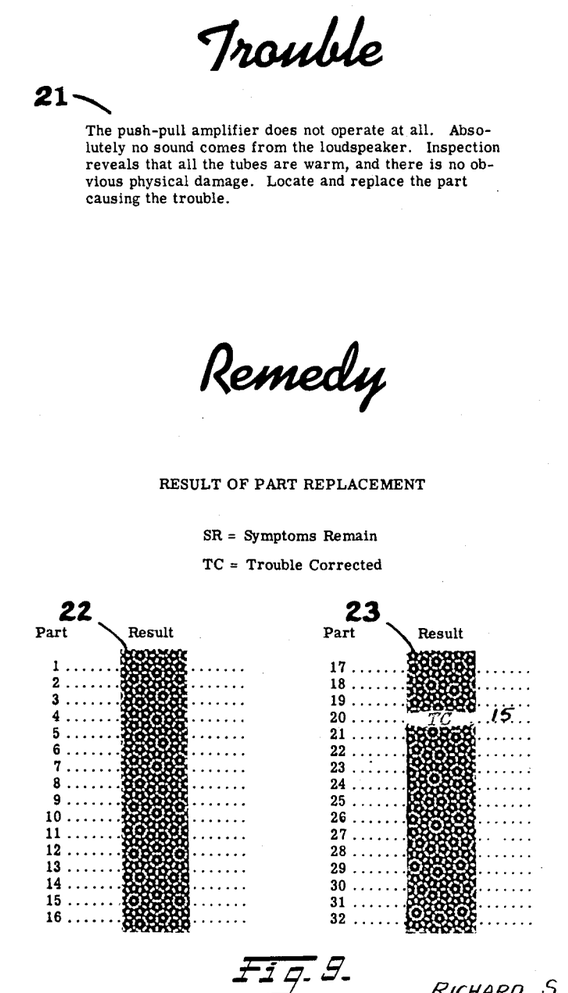
FIGS. 9, 9A and 9B when disposed in side by side relation constitute a reproduction of a printed chart setting forth the problem to be answered together with columns of answers or other items of information printed and concealed in accordance with the practice of the instant invention.
Figure 9A:
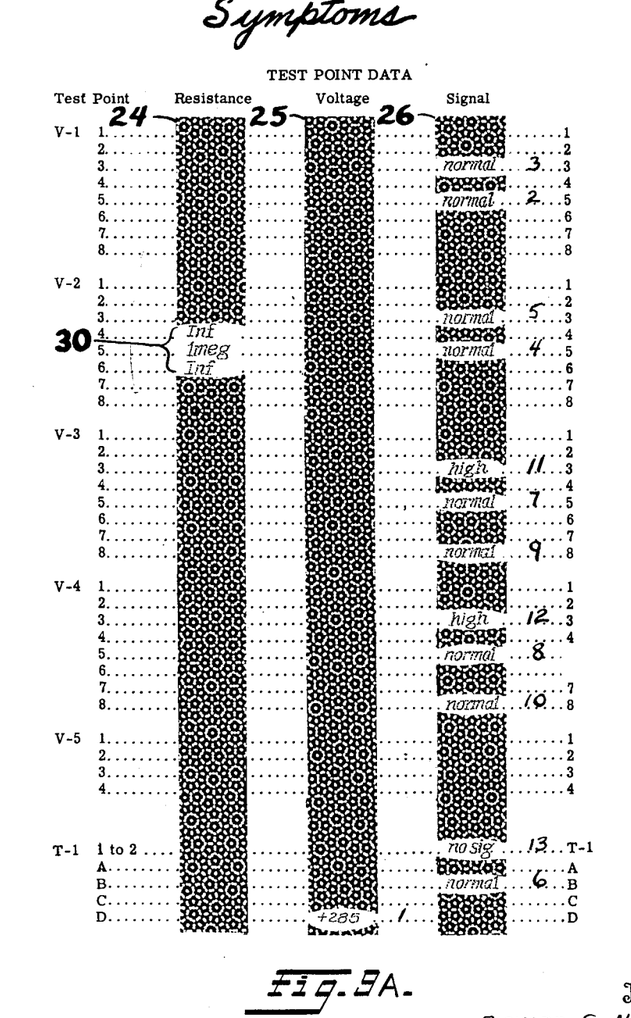
Figure 9B:
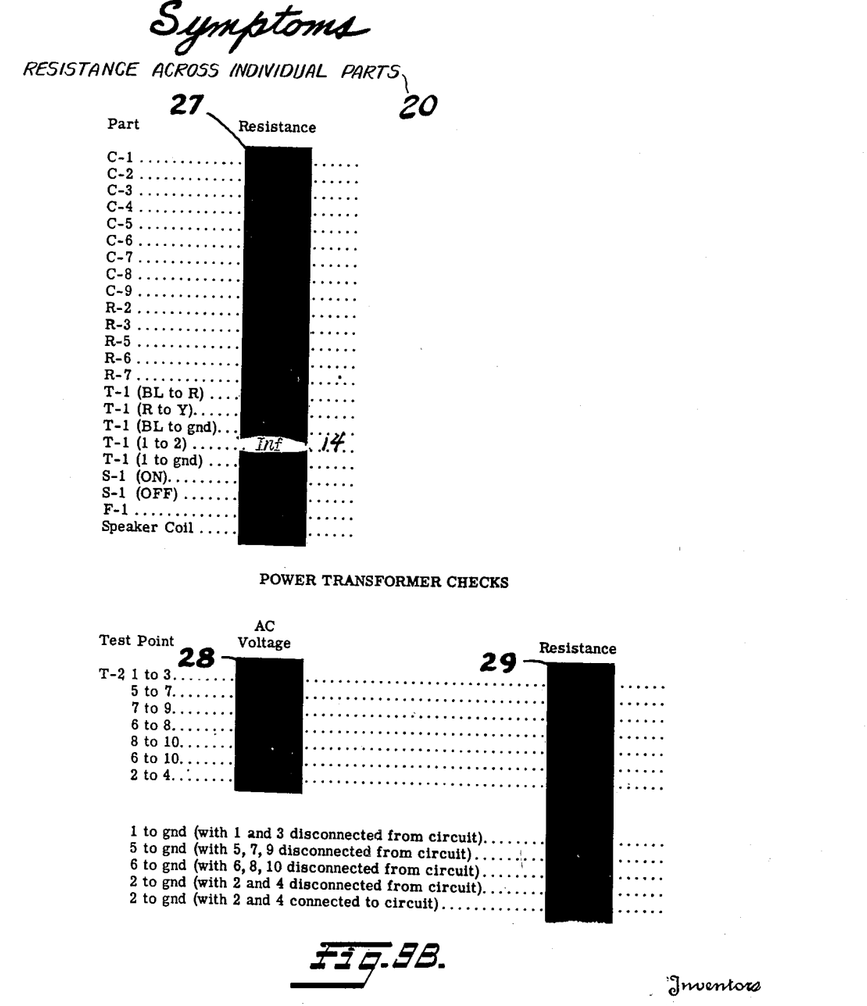

The instant invention has noteworthy application to simulator apparatus particularly of the type disclosed in the aforesaid patent and application by reason of the fact that it provides improved "show through" and "see through" characteristics. This measurably improves the answer chart employed in the simulator apparatus wherein "show through" and "see through" play an important, if not critical role. Reference is now made to FIGS. 7 through 9 which illustrate simulator apparatus incorporating the invention. In this example, the simulator is employed to test whether a student understands the theory and operation of electronic equipment such as a push-pull amplifier. The simulator is designed to require the student to troubleshoot the equipment; by this technique, the simulator will reinforce the student's understanding of the theory and operation of the push-pull amplifier.

FIG. 7 is a reproduction of a chart 10 illustrating a schematic diagram of the push-pull amplifier. FIG. 8 illustrates a chart 11 which is a pictorial view of the equipment. Chart 11 reproduces realistically or pictorially simulates the equipment. In other words, it is the pictorial view observed by the student were he to turn over the actual equipment and examine the exposed wire circuit thereof were he in possession of such equipment. It will be understood that one basic advantage of the simulator is that it takes the place of the actual equipment under study. Accordingly, such simulators may be used for home study or classroom study without having each student supplied with sample equipment. Consequently, chart 11 will be used as if it were the actual equipment under study and to be repaired.

For the purpose of instruction, a prepared problem 21 is printed on a chart 20 of the answer sheet illustrated in FIG. 9. Chart 20 is provided with a number of columns of printed answers 22 through 29. The answers are printed directly on a suitable medium such as cardboard or paper. The numbers constituting the answers are screen printed. The answer columns are hidden from view by correlated overlayers of printed confusing shields except that in columns 27, 28 and 29 the overlying shields are relatively solid and opaque. As noted in the aforesaid application and patent, the overlying shields are sectionally removable so that individual answers may be selected by removing only that portion of the overlying shield and so as to expose the selected answer without disturbing the portion of the shield overlying adjacent answers. The printed answers are prearranged to correlate the equipment under study with problem 21. Tabular information in the nature of the headings for each column and symbols or reference numbers alongside the hidden or obscured answers correlate the answers with the information set forth on charts 10 and 11.

From the statement of problem 21, ". . . all the tubes are warm . . .," the student should understand that all tubes are drawing filament current. This eliminates any reason to suppose that there is trouble in the line cord, fuse or power switch. To simulate the measuring of B+ voltage the student will determine the points across which he will connect his D.C. voltmeter. From chart 10, the D.C. voltage can be checked at pins 3 or 4 of tubes V–3 or V–4. The voltage can also be measured across resistor R–11 from test point D to ground. To measure the D.C. voltage from D to ground, the student will locate point D along the voltage column 25, FIG. 9, since it is voltage that is being measured. The pertinent section of the covering shield juxtaposed symbol D is removed by a stylus or pencil eraser. The uncovered data reads "+285." The student writes number 1 alongside the column 25 at reference D to show that this was his first step. By showing the sequence of steps in finding the solution the student shows not only his answer but also the manner in which he developed same. This permits more accurate evaluation and grading of the student. The uncovered answer +285 means that the voltmeter reading is 285 volts, and accordingly the power supply is operating properly.

Now assume that the student will next decide to trace the signal starting from the input side of the amplifier until he uncovers the trouble. The student simulates the checking of the input signal at grid 5 of tube V–1 by erasing alongside the reference number 5 of V–1 of column 26. He also writes the number 2 alongside to show that this was his second step. The exposed response is "normal." This means that the signal is getting to this point and that the student should search further. The third step is the plate pin 3 of tube V–1 and upon erasure at reference number 3 of V–1 of column 26 he again finds the response is "normal." He also shows that this is his third step by marking 3 alongside. The next point to check is the grid of V–2 (pin 5), which also shows up a "normal." The fifth and sixth checks will be the outputs of the phase inverter stage of the amplifier. These are, respectively, pin 3 and test point B of tube V–2. Both are found to be "normal." Next the student checks the push-pull amplifier stage which requires the additional steps of seven to twelve. Steps eleven and twelve reveal that the signal is "high" at the plates of V–3 and V–4. This shows an abnormal situation. A proficient student will next check the secondary of the output transformer T–1. A check here will reveal that no signal, "no sig," is coming through. The sound-reasoning student would first prove to himself that the transformer is faulty before replacing same. Therefore he checks the resistance across the transformer output, note step fourteen at column 27. The answer is infinite, "inf," which tells him that there is an open in the secondary and explains the trouble. His next step is to replace the transformer. By the use of chart 11, the student learns that the transformer is part reference number 20. Erasure at reference number 20, column 23, which is his fifteenth step, means that the student has simulated the replacement of the transformer. The uncovered answer or response shows that the student corrected the trouble, and in addition such answer or response acts as the instructor by telling the student that his answers and his mode of correcting the trouble is correct.

It is, therefore, seen that to function properly, answer chart 20 must at the start of the problem have all its answers hidden so that they are not discernible under any circumstance until the overlying shield is removed. In addition, the overlying shield is characterized by being sectionally removable so that the selected answer is exposed without disturbing the shield overlying adjacent answers.

Figure 10:
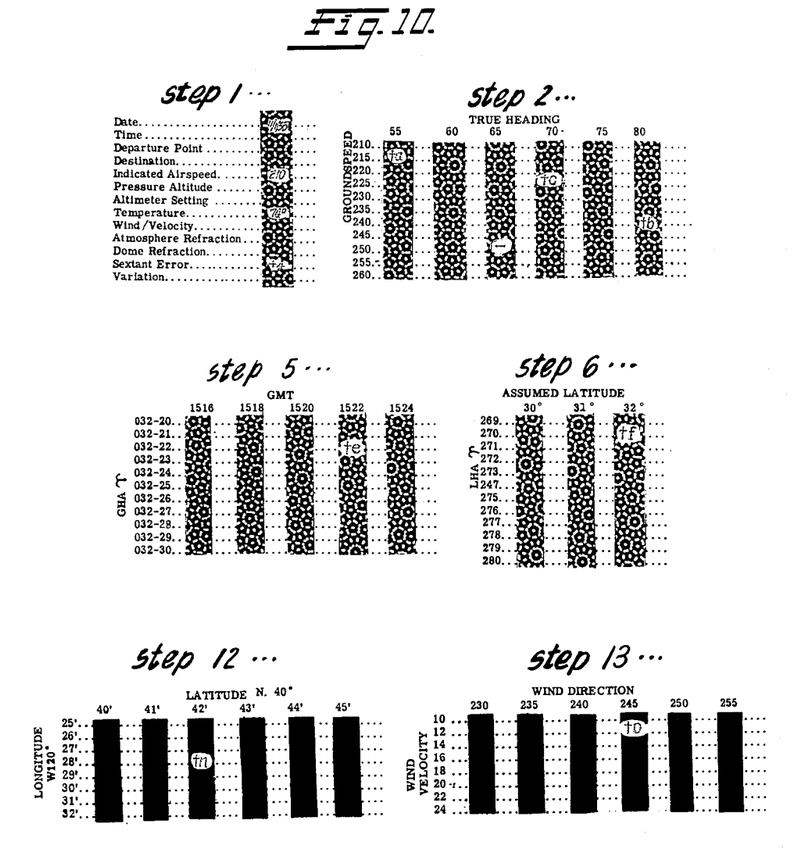
FIGS. 10 and 10A when disposed in side by side relation constitute a reproduction of another type of answer chart made in accordance with the instant invention.

The embodiment of FIG. 10 discloses a self-instruction problem simulator of a multiple choice variety but of more complex nature in that the problem is made up of related and sequential study problems illustrated as Steps 1 through 14. The simulator is constituted by a chart 40 and in this example applies to the field of celestial navigation. Chart 40 is meant to be used in conjunction with the regular tools of the navigator's trade, namely, a dead reckoning kit (computer, plotter, dividers, maps, etc.) charts, celestial tables for a particular period and, if available, the form used by the navigator for celestial precomputation and solution.

The sequential steps of simulator 40 are related, that is to say, each step is an individual study problem or question related to the lower and higher numbered study problems to the extent that a correct answer for one question is required before the next study problem of the sequence can be properly solved. This condition simulates accurately the usual pattern of technical problems.

The process of determining a celestial navigation fix has been pre-established on the basis of the 14 steps shown in chart 40. Step 1 provides the user with the flight planning information that would normally be provided by the instructor or obtained from an airport operations office; namely, date, time of departure, departure point, destination, indicated airspeed, temperature, etc. Upon obtaining this information, the user can establish a track on his chart and write it down on his precomputation form. This information is obtained from simulator chart 40 by means of the user going to Step 1 and rendering the data responses visible opposite the information he thinks pertinent. Responses are concealed and individually exposable in the manner as noted hereinbefore. Throughout the example, the user can be required to write down alongside each data response his sequence. For illustrated purposes, in Step 1, the data: date, indicated airspeed, temperature and sextant error are visible.

Step 2 requires the user to compute ground speed and true heading of his aircraft. Groundspeed is computed from the data responses gathered from Step 1—indicated airspeed, altitude, winds, etc. In like manner, true heading is also computed from the data responses of Step 1—departure point, destination, winds. Once the user computes these two values, he registers his computations by erasing the overlying material in Step 2 of Fig. 10 at the junction of the ordinates of his computed values, see reference number 41. In effect, the user selects from a large number of available answers that which he believes to be the correct answer, as determined by his computations.

If his computations are not correct, the user will receive a response such as a "minus" sign or a coded response which tells him and subsequently an instructor that his computations were wrong. When the user uncovers an incorrect response, he naturally must go back and correct himself. Step 2 reveals, for illustrative purposes, three incorrect responses 42, 43, 44. Reference 42 is a "minus" sign whereas references 43 and 44 are, respectively, dagger *a* and dagger *b*. In addition, dagger *a* and dagger *b* are correlated with footnotes which refer the student to a particular page of a textbook or other instructional reference material pertinent to this phase of the problem wherein the student will find theory or information explaining the correct method of solving the problem. In other words, the responses may be coded to guide the student to explanatory or reinforcing reference material to assist the student in understanding why or how his answer is incorrect. On the other hand, when the user is told that his computations are correct by the selection of dagger *c*, reference 41, he is provided with data required for the solution of the next step or problem. Examination of Steps 3 through 13 will reveal additional visible response information supplied to the user as he proceeds to compute correct responses at each of the stages of this sequential problem wherein ultimately the user arrives at the ultimate solution.

Again, it will be noted that certain of the covering shields employ the confusion pattern such as shown with respect to Steps 1 through 11, whereas other of the steps employ the relatively opaque and solid shield as shown in respect to Steps 12 through 14. In each case the responses are made up of screen printed letters.

The completion of the mission simulated includes the calculation of latitude and longitude, estimated time of arrival (ETA), Greenwich Hour Angle of Aries, Greenwich Mean Time, the shooting of three celestial bodies with the sextant and the subsequent correction of heading and estimated time of arrival at final destination (Step 14).

Figure 10A:
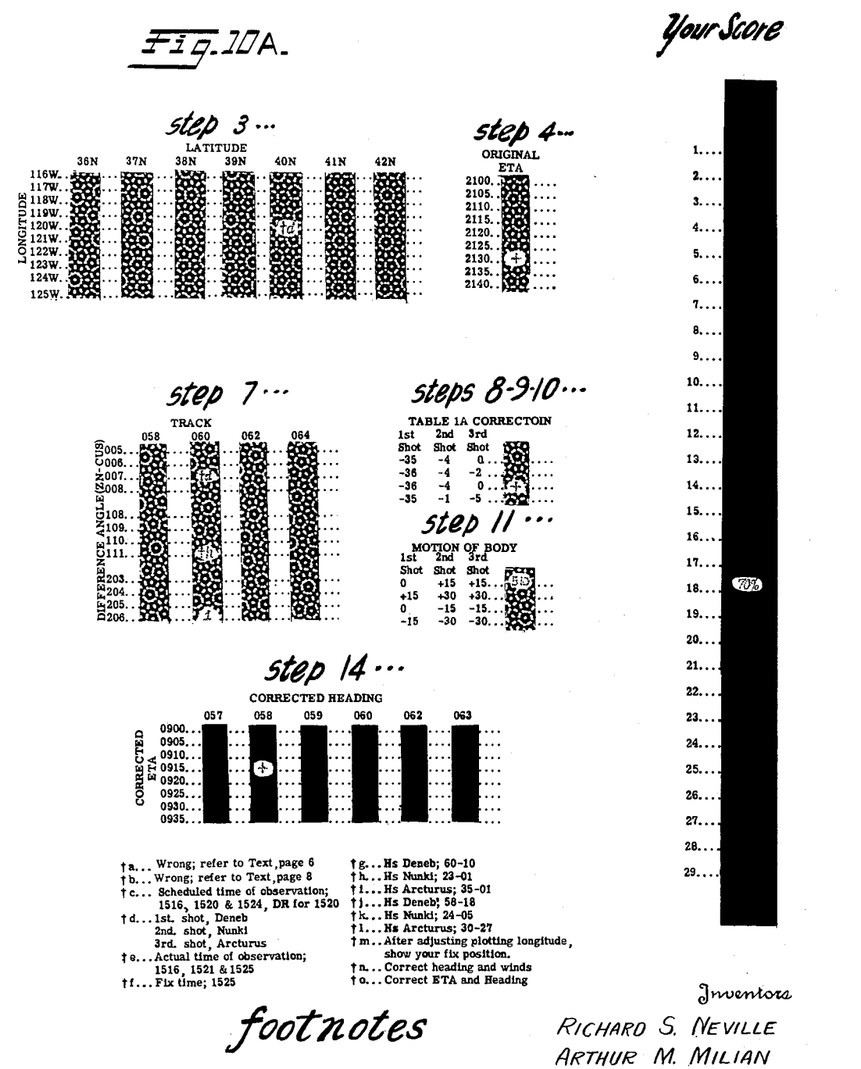

A score scale 45 allows the user to determine his grade at completion of the mission. At the conclusion of the study problem, the student tallies the number of erasures and refers to the self-scoring column 45 alongside of which are key symbols, such as 1, 2, 3 through 29. The score column consists of a removable ink shield under which are predetermined score responses made up of screen printed letters. For example, if there are 18 erasures, the score of 70% is exposed to indicate the mark or grade received for the particular test. The score responses are predetermined so that the number of erasures made by the student will accurately reflect his qualitative grade.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus containing responses which are temporarily concealed and which can be selectively exposed to view comprising, a supporting sheet, separate indicia forming said responses printed on said supporting sheet, each indicium of said indicia comprising a discontinuous layer of printing ink having unprinted interstices dispersed throughout said indicium, an optical confusion pattern removable section-by-section overlaying said printed indicia and comprising a discontinuous concealing shield having interstices dispersed throughout said concealing shield, whereby said responses are concealed from view prior to being selectively exposed by removal of said pattern.

2. A process for manufacturing apparatus containing responses which are temporarily concealed and which can be selectively exposed to view comprising; providing a supporting sheet, printing on said supporting sheet separate indicia forming said responses in such a manner that each indicium of said indicia comprises a discontinuous layer of printing ink having unprinted interstices throughout said indicium, and printing over said responses a removable section-by-section optical confusion pattern comprising a discontinuous layer having interstices dispersed throughout said confusion pattern, whereby said responses are temporarily concealed from view prior to said removal.

References Cited in the file of this patent
UNITED STATES PATENTS

| | | |
|---|---|---|
| 2,179,168 | Alexander | Nov. 7, 1939 |
| 2,410,800 | Baumgartner | Nov. 12, 1946 |
| 2,764,821 | Buitenkant | Oct. 2, 1956 |